US012764600B2

(12) United States Patent
Omiya et al.

(10) Patent No.: US 12,764,600 B2
(45) Date of Patent: Oct. 13, 2026

(54) WIRELESS COMMUNICATION SYSTEM, WIRELESS COMMUNICATION METHOD, BASE STATION, AND CONTROL PROGRAM

(71) Applicant: NTT, Inc., Tokyo (JP)

(72) Inventors: Riku Omiya, Musashino (JP); Junichi Iwatani, Musashino (JP); Akira Kishida, Musashino (JP); Shinya Otsuki, Musashino (JP); Yusuke Asai, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 323 days.

(21) Appl. No.: 18/711,695

(22) PCT Filed: Dec. 3, 2021

(86) PCT No.: PCT/JP2021/044505
§ 371 (c)(1),
(2) Date: May 20, 2024

(87) PCT Pub. No.: WO2023/100361
PCT Pub. Date: Jun. 8, 2023

(65) Prior Publication Data
US 2025/0016616 A1 Jan. 9, 2025

(51) Int. Cl.
*H04W 28/04* (2009.01)

(52) U.S. Cl.
CPC .................................. *H04W 28/04* (2013.01)

(58) Field of Classification Search
CPC .................................................... H04W 28/04
See application file for complete search history.

(56) References Cited

U.S. PATENT DOCUMENTS

| | | | | |
|---|---|---|---|---|
| 11,930,447 | B2 * | 3/2024 | Tanaka | H04W 48/18 |
| 2010/0178872 | A1 * | 7/2010 | Alrabady | H04W 4/029 455/41.3 |

(Continued)

OTHER PUBLICATIONS

Khorov et al., "Current Status and Directions of IEEE 802.11be, the Future Wi-Fi 7", IEEE Access, vol. 8, May 21, 2020, pp. 88664-88688.

*Primary Examiner* — Abdeltif Ajid
(74) *Attorney, Agent, or Firm* — XSENSUS LLP

(57) ABSTRACT

A wireless communication system according to one embodiment is a wireless communication system including: one or more wireless terminals capable of communicating by both a first communication scheme using a first frequency band and a second communication scheme using a second frequency band, which is higher than the first frequency band; and a multi-device compatible base station that accommodates the wireless terminals, and the wireless communication system includes: number-of-times measurement circuitry configured to measure the number of retries for attempting communication by the second communication scheme; and a controller to perform control such that the base station performs wireless communication by the first communication scheme without using the second communication scheme until a predetermined time elapses with respect to a wireless terminal in which the number of times measured by the number-of-times measurement circuitry exceed a predetermined number of times.

7 Claims, 5 Drawing Sheets

(56) References Cited

U.S. PATENT DOCUMENTS

| | | | | |
|---|---|---|---|---|
| 2019/0305895 | A1* | 10/2019 | Tanaka | H04L 1/1887 |
| 2020/0413491 | A1* | 12/2020 | Ansley | H04W 92/02 |
| 2021/0076424 | A1* | 3/2021 | Mukherjee | H04L 27/0006 |
| 2021/0315025 | A1* | 10/2021 | Seok | H04L 1/0008 |
| 2022/0015024 | A1* | 1/2022 | Tanaka | H04W 48/18 |
| 2022/0116861 | A1* | 4/2022 | Tomizu | H04W 52/02 |
| 2022/0361231 | A1* | 11/2022 | Oh | H04L 1/189 |

* cited by examiner

WIRELESS COMMUNICATION SYSTEM, WIRELESS COMMUNICATION METHOD, BASE STATION, AND CONTROL PROGRAM

CROSS-REFERENCE TO RELATED APPLICATION

The present application is based on PCT filing PCT/JP2021/044505, filed Dec. 3, 2021, the entire contents of which is incorporated herein by reference.

TECHNICAL FIELD

The present invention relates to a wireless communication system, a wireless communication method, a base station, and a control program.

BACKGROUND ART

In recent wireless communication systems, it is important to increase wireless capacity in order to manage increasing mobile traffic. For example, in IEEE 802.11be (wireless LAN), a function of installing a plurality of different wireless LAN interfaces in one device and establishing a plurality of transmission paths is adopted, and such a device is called a multi-link device (MLD) (see, for example, Non Patent Literature 1). Furthermore, in IEEE 802.11be, use of the 6 GHz band has been examined.

CITATION LIST

Non Patent Literature

Non Patent Literature 1: EVGENY KHOROV et al., "Current Status and Directions of IEEE 802.11be, the Future Wi-Fi 7", IEEE Access, VOLUME 8, 2020, Received Apr. 15, 2020, accepted May 1, 2020, date of publication May 8, 2020, date of current version May 21, 2020, pp. 88664-88688

SUMMARY OF INVENTION

Technical Problem

For example, in a wireless LAN, when there is a wireless terminal of a low transmission rate with a poor communication status in a wireless communication system, the channel occupancy time of the terminal is long, and thus the communication speed of the entire system including a high transmission rate terminal may decrease.

Furthermore, when the communication of the low transmission rate terminal is disconnected, the terminal becomes incommunicable.

The present invention has been made in view of the above-described problems, and an object of the present invention is to provide a wireless communication system, a wireless communication method, a base station, and a control program capable of preventing a decrease in communication speed in a high frequency band in a multi-device compatible device using a low frequency band and the high frequency band.

Solution to Problem

A wireless communication system according to one embodiment of the present invention is a wireless communication system including: one or more wireless terminals capable of communicating by both a first communication scheme using a first frequency band and a second communication scheme using a second frequency band, which is higher than the first frequency band; and a multi-device compatible base station that accommodates the wireless terminals, the wireless communication system including: a number-of-times measurement unit that measures the number of retries for attempting communication by the second communication scheme; and a control unit that performs control such that the base station performs wireless communication by the first communication scheme without using the second communication scheme until a predetermined time elapses with respect to a wireless terminal in which the number of times measured by the number-of-times measurement unit exceeds a predetermined number of times.

In addition, a wireless communication method according to one embodiment of the present invention is a wireless communication method for controlling one or more wireless terminals capable of communicating by both a first communication scheme using a first frequency band and a second communication scheme using a second frequency band, which is higher than the first frequency band, and a multi-device compatible base station that accommodates the wireless terminals, the wireless communication method including: a number-of-times measurement step of measuring the number of retries for attempting communication by the second communication scheme; and a control step of performing control such that the base station performs wireless communication by the first communication scheme without using the second communication scheme until a predetermined time elapses with respect to a wireless terminal in which the measured number of times exceeds a predetermined number of times.

In addition, a base station according to one embodiment of the present invention is a multi-device compatible base station that accommodates one or more wireless terminals capable of communicating by both a first communication scheme using a first frequency band and a second communication scheme using a second frequency band, which is higher than the first frequency band, the base station including: a number-of-times measurement unit that measures the number of retries for attempting communication by the second communication scheme; and a control unit that performs control such that the base station performs wireless communication by the first communication scheme without using the second communication scheme until a predetermined time elapses with respect to a wireless terminal in which the number of times measured by the number-of-times measurement unit exceeds a predetermined number of times.

Advantageous Effects of Invention

According to the present invention, it is possible to prevent a decrease in communication speed in a high frequency band in a multi-device compatible device using a low frequency band and the high frequency band.

DESCRIPTION OF EMBODIMENTS

Figure 1:
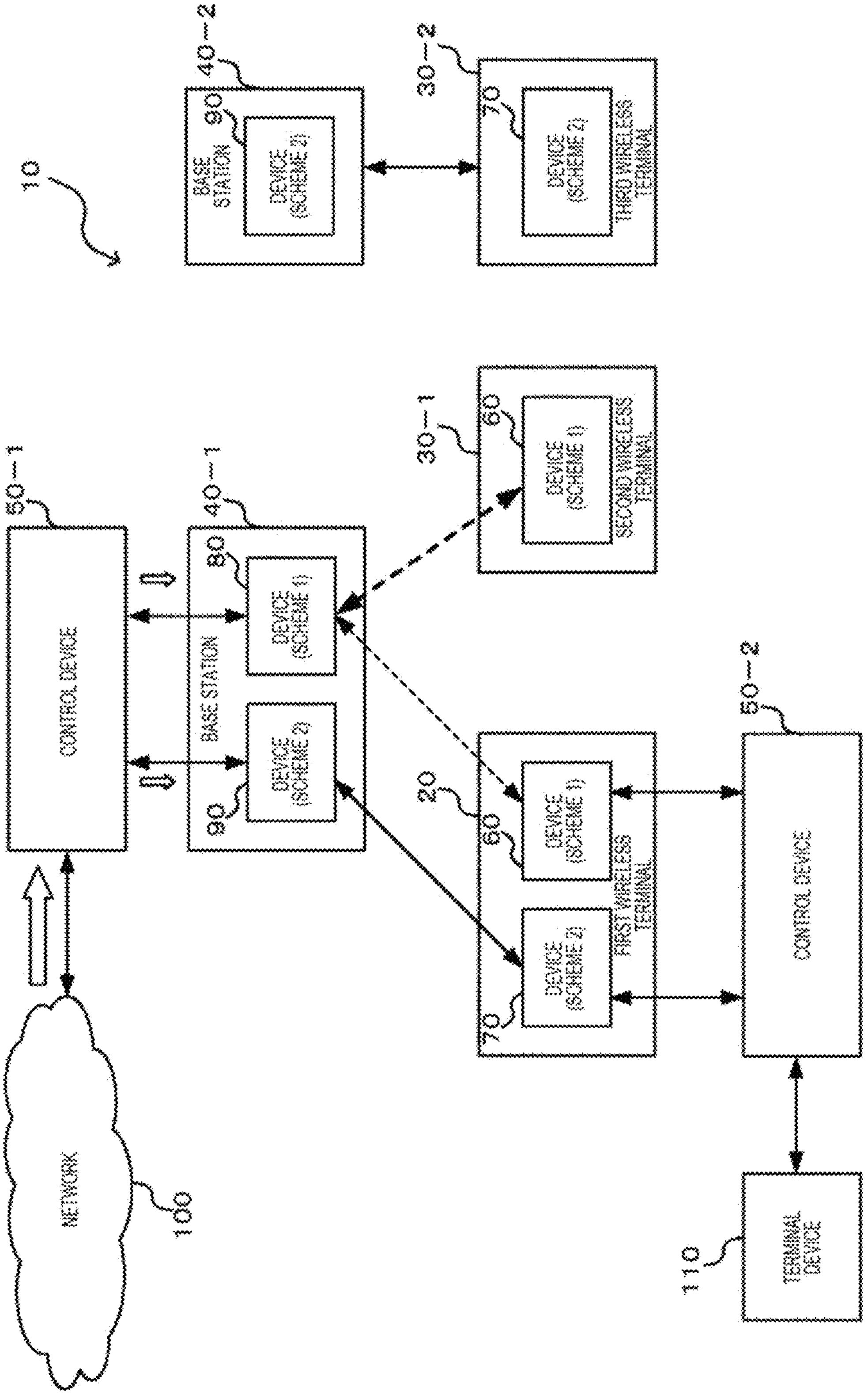
FIG. 1 is a diagram illustrating a configuration example of a wireless communication system according to one embodiment.

Hereinafter, a configuration example of a wireless communication system 10 according to one embodiment will be described with reference to the drawings. FIG. 1 is a diagram illustrating the configuration example of the wireless communication system 10 according to the one embodiment.

As illustrated in FIG. 1, the wireless communication system 10 according to the one embodiment includes, for example, a first wireless terminal 20, a second wireless terminal 30-1, a third wireless terminal 30-2, a base station 40-1, a base station 40-2, a control device 50-1, a control device 50-2, and a terminal device 110, and is connected to a network 100.

The control device 50-1 is connected to the network 100 and controls the base station 40-1 such that the base station 40-1 and each of the first wireless terminal 20 and the second wireless terminal 30-1 perform wireless communication.

The base station 40-1 is a multi-device compatible device, includes a device 80 serving as an access point (AP) of a scheme 1 and a device 90 serving as an AP of a scheme 2, and performs wireless communication with each of the first wireless terminal 20 and the second wireless terminal 30-1 according to the control of the control device 50-1.

The scheme 1 is, for example, a wireless communication scheme in the 5 GHz band in IEEE 802.11 (wireless LAN). The scheme 2 is, for example, a wireless communication scheme in the 6 GHz band in IEEE 802.11 (wireless LAN). A multi-device compatible device can perform wireless communication by simultaneously using the scheme 1 and the scheme 2.

Note that the base station 40-1 may be configured integrally with the control device 50-1. That is, the base station 40-1 may have each function included in the control device 50-1.

The first wireless terminal 20 is a multi-device compatible wireless terminal (STA) including a device 60 and a device 70 compatible with respective communication schemes (scheme 1 and scheme 2) of the device 80 and the device 90 included in the multi-device compatible base station 40-1 compatible with both the 5 GHz band and the 6 GHz band.

The device 60 is compatible with the communication scheme (scheme 1) of the device 80 included in the base station 40-1, and performs wireless communication with the device 80. The device 70 is compatible with the communication scheme (scheme 2) of the device 90 included in the base station 40-1, and performs wireless communication with the device 90.

The second wireless terminal 30-1 is a wireless terminal including a device 60 compatible with only a part (scheme 1) of the respective communication schemes (scheme 1 and scheme 2) of the device 80 and the device 90 included in the base station 40-1. For example, in the second wireless terminal 30-1, the device 60 compatible with only the 5 GHz band performs wireless communication with the device 80 of the base station 40-1.

The control device 50-2 is connected to the terminal device 110, and controls the first wireless terminal 20 such that, for example, the first wireless terminal 20 and the base station 40-1 perform wireless communication. The control device 50-2 may have substantially the same configuration as the control device 50-1. The terminal device 110 is a computer or the like that controls the control device 50-2.

The base station 40-2 includes a device 90 serving as an AP of the scheme 2, and performs wireless communication with the third wireless terminal 30-2. The third wireless terminal 30-2 is a wireless terminal including a device 70 compatible with only the communication scheme (scheme 2) of the device 90 included in the base station 40-2. For example, in the third wireless terminal 30-2, the device 70 compatible with only the 6 GHz band performs wireless communication with the device 90 of the base station 40-2.

That is, the wireless communication system 10 is a wireless communication system including the first wireless terminal 20 capable of communicating by both the first communication scheme using the first frequency band (5 GHZ) and the second communication scheme using the second frequency band (6 GHZ), which is higher than the first frequency band, and the multi-device compatible base station 40-1 that accommodates the first wireless terminal 20 and the second wireless terminal 30-1.

Figure 2:
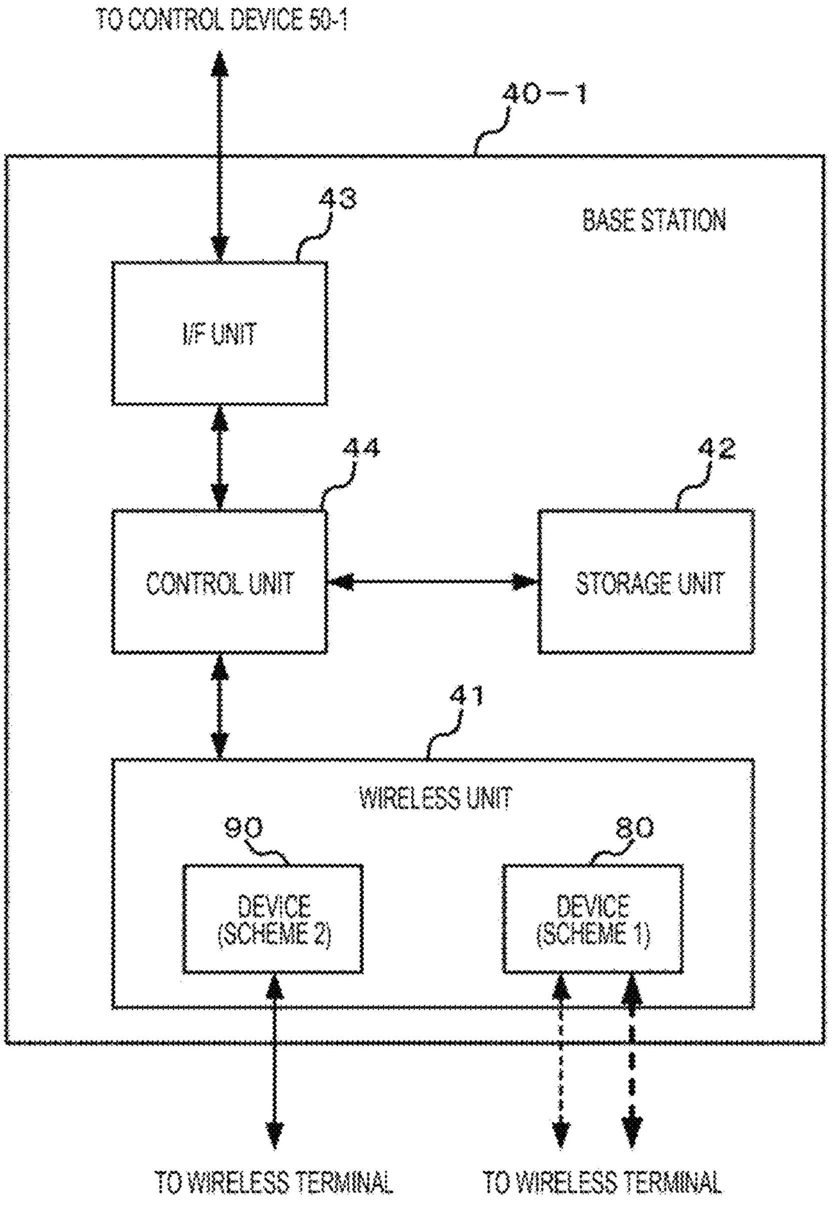
FIG. 2 is a diagram illustrating a specific configuration example of a base station according to the one embodiment.

Next, a specific configuration example of the base station 40-1 will be described. FIG. 2 is a diagram illustrating the specific configuration example of the base station 40-1 according to the one embodiment. As illustrated in FIG. 2, the base station 40-1 includes, for example, a wireless unit 41, a storage unit 42, an interface (I/F) unit 43, and a control unit 44.

The wireless unit 41 includes the device 80 and the device 90 described above, and performs wireless communication with each of the first wireless terminal 20 and the second wireless terminal 30-1.

The storage unit 42 stores information and the like received by the base station 40-1 via the wireless unit 41 or the I/F unit 43.

The I/F unit 43 is a communication interface that communicates with the control device 50-1.

The control unit 44 controls each of the units constituting the base station 40-1.

Figure 3:
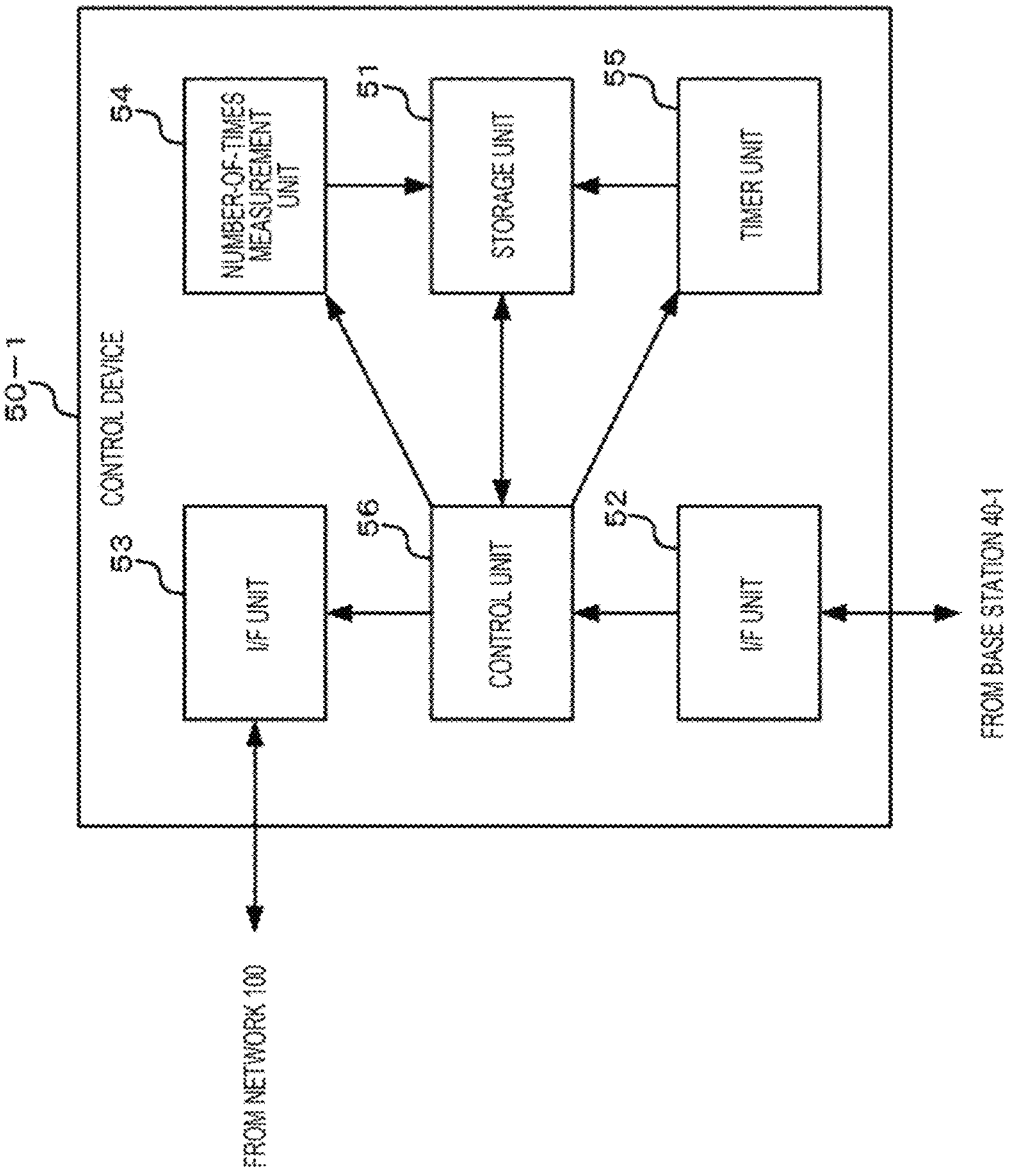
FIG. 3 is a diagram illustrating a specific configuration example of a control device.

Next, a specific configuration example of the control device 50-1 will be described. FIG. 3 is a diagram illustrating the specific configuration example of the control device 50-1. As illustrated in FIG. 3, the control device 50-1 includes, for example, a storage unit 51, an interface (I/F) unit 52, an interface (I/F) unit 53, a number-of-times measurement unit 54, a timer unit 55, and a control unit 56.

The storage unit 51 is a storage device that stores data in the control device 50-1.

The I/F unit 52 is a communication interface that communicates with the base station 40-1. The I/F unit 53 is a communication interface that communicates with the network 100.

The number-of-times measurement unit 54 measures, via the I/F unit 52, the number of retries in which the base station 40-1 and the first wireless terminal 20 attempt communication by the second communication scheme using the second frequency band (6 GHZ), and outputs the measurement result to the storage unit 51.

The timer unit 55 measures a time or the like required for each piece of processing or the like in the control device 50-1 and outputs the time to the storage unit 51.

The control unit 56 controls each of the units constituting the control device 50-1. For example, the control unit 56 performs control such that the base station 40-1 performs wireless communication by the first communication scheme using the first frequency band (5 GHZ) without using the second communication scheme using the second frequency band (6 GHZ) until a predetermined time elapses with respect to a wireless terminal (for example, the first wireless terminal 20) in which the number of times measured by the number-of-times measurement unit 54 via the I/F unit 52 exceeds a predetermined number of times.

Figure 4:
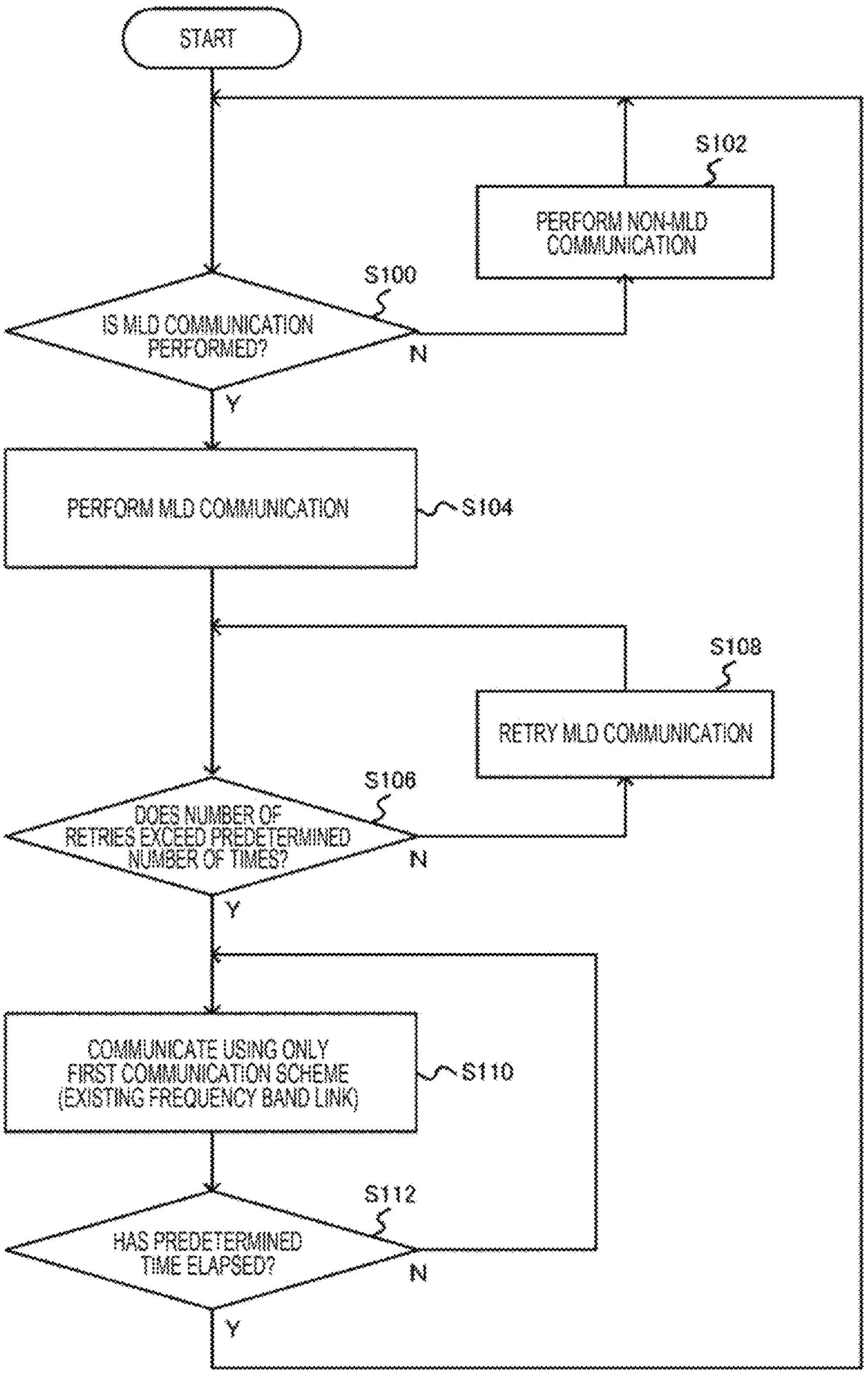
FIG. 4 is a flowchart illustrating an operation example of the wireless communication system.

Next, an operation example of the wireless communication system 10 will be described. FIG. 4 is a flowchart illustrating the operation example of the wireless communication system 10.

In the wireless communication system 10, for example, the control device 50-1 determines whether the base station 40-1 and the first wireless terminal 20 perform MLD communication (S100). In a case where MLD communication is not performed (S100: No), the processing proceeds to S102, and in a case where MLD communication is performed (S100: Yes), the processing proceeds to S104.

In the processing of S102, the base station 40-1 and the first wireless terminal 20 perform non-MLD communication.

In the processing of S104, the base station 40-1 and the first wireless terminal 20 perform MLD communication.

Next, the control device 50-1 determines whether the number of retries in which the base station 40-1 and the first wireless terminal 20 attempt communication by the second communication scheme in the MLD communication exceeds a predetermined number of times (S106). In a case where the number of retries does not exceed the predetermined number of times (S106: No), the processing proceeds to S108, and in a case where the number of retries exceeds the predetermined number of times (S106: Yes), the processing proceeds to S110.

In the processing of S108, the base station 40-1 and the first wireless terminal 20 retry the MLD communication.

In the processing of S110, the base station 40-1 and the first wireless terminal 20 communicate using only the first communication scheme (existing frequency band link).

In the processing of S112, the control device 50-1 determines whether a predetermined time has elapsed after the base station 40-1 and the first wireless terminal 20 start communication using only the first communication scheme. In a case where it is determined that the predetermined time has not elapsed (S112: No), the processing returns to S110, and in a case where it is determined that the predetermined time has elapsed (S112: Yes), the processing returns to S100.

As described above, the wireless communication system 10 according to the one embodiment regards a wireless terminal in which the number of retries exceeds a predetermined number of times as, for example, a low transmission rate terminal with a poor communication status, and performs communication using only a low frequency band without using a high frequency band for a predetermined time. Therefore, it is possible to prevent a decrease in communication speed in the high frequency band (for example, 6 GHZ) in a multi-device compatible device using the low frequency band (for example, 5 GHZ) and the high frequency band (for example, 6 GHZ), that is, to prevent a decrease in communication quality.

Note that some or all of the functions of the control device 50-1 may be configured by hardware such as a programmable logic device (PLD) or a field programmable gate array (FPGA), or may be configured as a program executed by a processor such as a CPU.

For example, the control device 50-1 can be implemented by use of a computer and a program, and the program can be recorded in a storage medium or provided through a network.

Figure 5:
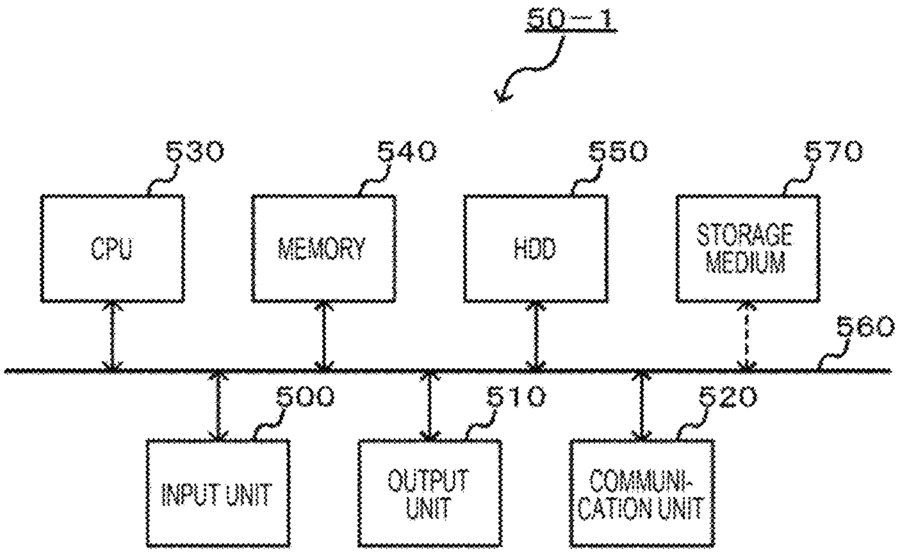
FIG. 5 is a diagram illustrating a hardware configuration example of the control device.

FIG. 5 is a diagram illustrating a hardware configuration example of the control device 50-1. As illustrated in FIG. 5, the control device 50-1 has a function as a computer in which an input unit 500, an output unit 510, a communication unit 520, a CPU 530, a memory 540, and an HDD 550 are connected via a bus 560. In addition, the control device 50-1 can input and output data to and from a computer-readable storage medium 570.

The input unit 500 is, for example, a keyboard, a mouse, or the like. The output unit 510 is, for example, a display device such as a display. The communication unit 520 is, for example, a network interface or the like.

The CPU 530 controls each of the units constituting the control device 50-1 and performs predetermined processing and the like. The memory 540 and the HDD 550 are storage units that store data and the like.

The storage medium 570 can store a program or the like for executing the functions of the control device 50-1. Note that the architecture of the control device 50-1 is not limited to the example illustrated in FIG. 5.

REFERENCE SIGNS LIST

10 Wireless communication system
20 First wireless terminal
30-1 Second wireless terminal
30-2 Third wireless terminal
40-1, 40-2 Base station
41 Wireless unit
42 Storage unit
43 I/F unit
44 Control unit
50-1, 50-2 Control device
51 Storage unit
52, 53 I/F unit
54 Number-of-times measurement unit
55 Timer unit
56 Control unit
60, 70, 80, 90 Device
100 Network
500 Input unit
510 Output unit
520 Communication unit
530 CPU
540 Memory
550 HDD
560 Bus
570 Storage medium

The invention claimed is:

1. A wireless communication system including: one or more wireless terminals capable of communicating by both a first communication scheme using a first frequency band and a second communication scheme using a second frequency band, which is higher than the first frequency band; and a multi-device compatible base station that accommodates the wireless terminals, the wireless communication system comprising:

number-of-times measurement circuitry configured to measure the number of retries for attempting communication by the second communication scheme; and a controller to perform control such that the base station performs wireless communication by the first communication scheme without using the second communication scheme until a predetermined time elapses with respect to a wireless terminal in which the number of times measured by the number-of-times measurement circuitry exceed a predetermined number of times.

2. The wireless communication system according to claim 1, wherein the first communication scheme and the second communication scheme are wireless communication schemes conforming to a standard of a wireless LAN.

3. A wireless communication method for controlling one or more wireless terminals capable of communicating by both a first communication scheme using a first frequency band and a second communication scheme using a second frequency band, which is higher than the first frequency band, and a multi-device compatible base station that accommodates the wireless terminals, the wireless communication method comprising:

measuring the number of retries for attempting communication by the second communication scheme; and performing control such that the base station performs wireless communication by the first communication scheme without using the second communication scheme until a predetermined time elapses with respect to a wireless terminal in which the measured number of times exceeds a predetermined number of times.

4. The wireless communication method according to claim 3, wherein the first communication scheme and the second communication scheme are wireless communication schemes conforming to a standard of a wireless LAN.

5. A multi-device compatible base station that accommodates one or more wireless terminals capable of communicating by both a first communication scheme using a first frequency band and a second communication scheme using a second frequency band, which is higher than the first frequency band, the base station comprising:

number-of-times measurement circuitry configured to measure the number of retries for attempting communication by the second communication scheme; and a controller to perform control such that the base station performs wireless communication by the first communication scheme without using the second communication scheme until a predetermined time elapses with respect to a wireless terminal in which the number of times measured by the number-of-times measurement circuitry exceed a predetermined number of times.

6. The base station according to claim 5, wherein the first communication scheme and the second communication scheme are wireless communication schemes conforming to a standard of a wireless LAN.

7. A non-transitory computer-readable storage medium storing a control program for causing a computer to function as each circuitry of the base station according to claim 5.

* * * * *